United States Patent [19]

Joseph

[11] 4,129,503
[45] Dec. 12, 1978

[54] OIL PUMP INLET SCREEN ASSEMBLY

[75] Inventor: A. David Joseph, North Muskegon, Mich.

[73] Assignee: Sealed Power Corporation, Muskegon, Mich.

[21] Appl. No.: 882,269

[22] Filed: Feb. 28, 1978

[51] Int. Cl.² .......................................... B01D 25/04
[52] U.S. Cl. .................................... 210/232; 137/590; 285/189; 285/382; 210/416 L; 210/455; 210/460
[58] Field of Search ............... 285/382, 189; 137/590; 210/162, 168, 197, 220, 232, 240, 416 R, 416 F, 416 L, 455, 456, 459, 460, 462, 463, DIG. 11; 29/157 R, 157 B

[56] References Cited

U.S. PATENT DOCUMENTS

| | | | |
|---|---|---|---|
| 1,773,134 | 8/1930 | Fisher | 210/168 |
| 1,800,585 | 4/1931 | Woolson | 210/168 |
| 2,192,438 | 3/1940 | Gulick | 210/460 |
| 3,189,126 | 6/1965 | May | 137/590 |
| 3,662,887 | 5/1972 | Uhlhorn | 210/416 L |
| 3,773,144 | 11/1973 | Hummel | 210/168 |

*Primary Examiner*—Frank Sever
*Attorney, Agent, or Firm*—Barnes, Kisselle, Raisch & Choate

[57] ABSTRACT

A pipe joint specifically adapted for an oil pump inlet screen, and a method of assembly therefor, comprising a metal pipe adapted at one end to be connected to an oil pump housing and a filter screen including a molded plastic screen housing having an aperture adapted to receive the other pipe end. A metal eyelet is molded into the plastic housing and extends therefrom to embrace a circumferential rib formed on the outside surface of the pipe. An annular resilient sealing ring surrounds the pipe and is captured by the eyelet in sealing compression between the circumferential rib and the housing.

2 Claims, 3 Drawing Figures

U.S. Patent
Dec. 12, 1978
4,129,503
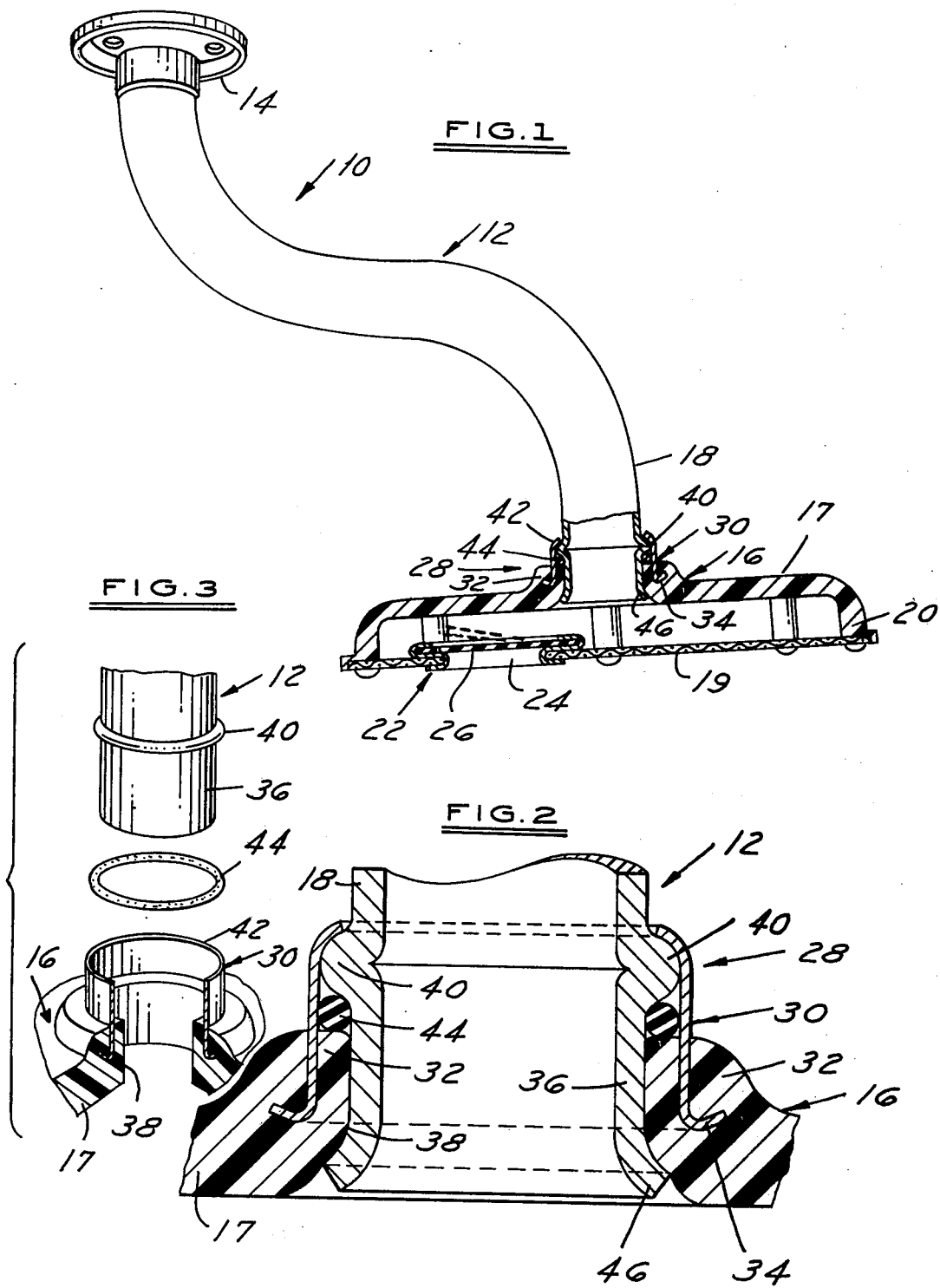

OIL PUMP INLET SCREEN ASSEMBLY

The present invention relates to metal-to-plastic pipe or tube joints and to methods for manufacture thereof. More particularly, the invention relates to joints between the pipe and housing of an oil pump inlet screen assembly for an internal combustion engine or the like.

An object of the present invention is to provide an economical and reliable metal-to-plastic pipe joint and a method for manufacture thereof. More specific objects of the invention are to provide a joint between a metal pipe and plastic housing adapted for use in an oil pump inlet screen assembly which is able to withstand the high temperature and vibration conditions of an internal combustion engine oil circulation system. A particular object of the invention is to provide a metal-to-plastic pipe joint for use in the environment described which prevents plastic shrinkage and/or creep in the zone of the pipe joint and consequent loss of sealing engagement between the joint members.

The accompanying drawings may be briefly described as follows:

FIG. 1 is a broken elevational view of an oil pump inlet screen assembly in accordance with the invention;

FIG. 2 is an enlarged view of the pipe joint illustrated in FIG. 1; and

FIG. 3 is an exploded perspective view illustrating assembly of the pipe joint in FIG. 2.

Referring to FIG. 1, an oil pump inlet screen assembly 10 in accordance with the invention comprises a metal conduit or pipe 12 having one end 14 adapted to be connected to an oil pump housing (not shown), and a filter screen generally indicated at 16 connected to a second pipe end 18 such that screen 16 may be suspended by pipe 12 from the pump housing and immersed in an oil sump. Screen 16 includes a downwardly dished housing 17 having a galvanized wire mesh 19 ultrasonically staked or welded around the downwardly opening edge 20 thereof. A pressure-relief flapper or leaf valve 22 is disposed in mesh 19 to provide unfiltered oil to the pump should mesh 19 become clogged, and comprises a collar 24 crimped around an opening in mesh 19 and capturing a leaf valve element 26 therein. Valves of the type illustrated at 22 are generally well known in the art and need not be described further.

Turning now to FIG. 2 in conjunction with FIG. 1, a presently preferred embodiment of the joint between metal pipe 12 and molded plastic housing 17 is indicated generally at 28. A metal eyelet 30 is molded into an upstanding shoulder portion 32 of housing 17 and includes at its inner end an outwardly-directed flange 34 disposed within shoulder portion 32 to resist removal of eyelet 30 from the housing. A generally cylindrical end 36 of pipe 12 is received in an aperture 38 in shoulder portion 32 of housing 17. Pipe end 36 includes a circumferential rib 40 formed on the outside surface of the pipe and embraced in assembly by the inwardly crimped outer end 42 of eyelet 30. An annular resilient sealing O-ring 44 is captured in compression by eyelet 30 between rib 40 and housing shoulder 32 to form an air-tight seal between the pipe and housing joint elements.

In accordance with an important feature of the invention, the inner edge 46 of pipe end 36 is flared radially outwardly within housing 17 and thereby places the zone or portion of housing shoulder portion 32 in the region of the pipe joint in a state of residual compression. This residual compressive stress condition, combined with the rigidifying effect of eyelet 30 molded into the housing, resists expansion and creep of the plastic material in the region of the joint under the severe temperature and high vibration environment of an internal combustion engine oil circulation system. Thus, the screen assembly and pipe joint provided by the invention combines the cost advantages of an injection-molded housing 17 with the strength and rigidity of a metal tube 12 by means of which the housing 17 is suspended from an oil pump.

FIG. 3 illustrated the pipe joint elements prior to assembly. As noted above, eyelet 30 is molded into plastic housing 17. Sealing ring 44 is placed over end 36 of pipe 12 against rib 40. Pipe end 36 is then inserted into housing aperture 38 such that sealing ring 44 is in compression, and then inner pipe edge 46 is flared radially outwardly against the opposing portion of housing 17 as hereinabove described. The outer end 42 of eyelet 30 is then rolled or crimped over pipe rib 40 to capture sealing ring 44 in compression against pipe end 36 and housing shoulder 32 to form an air-tight seal.

The invention claimed is:

1. An oil pump inlet screen assembly adapted to be immersed in an oil sump comprising a metal pipe adapted at one end to be connected to an oil pump housing and having a second end with a circumferential rib formed on an outer surface of said pipe adjacent said second end, a filter screen including a molded screen housing of oil-resistant plastic construction having an aperture adapted to receive said second pipe end, a metal eyelet molded at one end into said housing and having a second end embracing said rib, and an annular resilient sealing ring surrounding said pipe and captured by said eyelet in compression between said rib and said housing.

2. The screen assembly set forth in 1 wherein said second pipe end is flared radially outwardly internally of said housing.

* * * * *